United States Patent Office 3,592,854
Patented July 13, 1971

3,592,854
HYDROLYSIS OF AMIDES TO AMINES
Ralph H. Potts, La Grange, and Joseph S. Stalioraitis, Chicago, Ill., assignors to Armour Industrial Chemical Company, Chicago, Ill.
No Drawing. Filed July 19, 1968, Ser. No. 745,993
Int. Cl. C07c 85/00
U.S. Cl. 260—583                          11 Claims

ABSTRACT OF THE DISCLOSURE

A process for the hydrolysis of amides to amines using large amounts of a lower aliphatic primary alcohol as a mutual solvent to hold both the caustic and the amide in water solution, so as to obtain an homogeneous system.

Heretofore amides have been hydrolized to amines with aqueous caustic. Such processes are economically unattractive as they are slow and require long reaction times. U.S. 2,587,043 shows that the reaction can be speeded up using an organic cosolvent and increasing the reaction temperatures. That reaction still generally requires several hours to reach completion and the hydrolizing medium must be replaced. Further, the crude product obtained is generally dark in color and must be purified by distillation. U.S. 2,281,879 shows a method of preparing an organic nitrogen base by reacting an inorganic salt of the base with an alkali-forming metal hydroxide in an anhydrous water-soluble alcohol and removing the insoluble alkali metal salt thus formed. Although this patent alleges that various amines may be prepared thereby, no specific examples of such preparation are given. Further, the product is an alkali metal salt, and additional purification would be necessary to derive the amine. Also, the process is time consuming, and the medium must be kept substantially anhydrous.

This invention therefore is directed to a process which overcomes many of the disadvantages experienced with prior processes, including the above objections. The invention provides a process in which the reaction is rapid, and does not require a large excess of caustic material. The process lends itself to continuous reactions, as it does not require agitation. More particularly, this invention is directed toward a process for the production of amines by hydrolysis of amide in aqueous caustic solution, and the improvement therein which comprises adding an aliphatic mono-alcohol as a mutual solvent to hold both the caustic and the amide in aqueous solution thereby maintaining a high reaction rate. Further, the process may be performed in either batch or continuous manner, and after the reaction is completed the alcohol may be flashed and recovered. Generally, the reaction stoichiometry for preferred conversion is 1 mole of amide, 1 mole of sodium hydroxide and 4 cc. of methanol per gram of sodium hydroxide.

A large number of aliphatic and aryl amides, and substituted amides, may serve as reactants in the process. Suitable amides include those having the general formula:

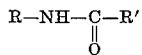

wherein R is an aliphatic hydrocarbon radical and R' is selected from the group consisting of hydrogen and short chain alkyl radicals having from 1 to 6 carbon atoms. When R is aliphatic, it may be straight or branched hydrocarbon chain, saturated or olefinically unsaturated, cyclic, or aralykyl such as 9,10-phenylstearyl such as derived from oleic acid. The aliphatic hydrocarbon radicals may be substituted with relatively unreactive hydrocarbon radicals such as amino, phenyl, naphthyl, tolyl, anisyl, and the like. It is preferred that R' be hydrogen or methyl; thus formamides and acetamides are preferred reactants. Useful higher homologues include propionamide, butyramide, valeramide, capronylamide, hexamide, and the like. Polyamides may serve as the amide reactant. Mixtures of amides may be used.

An especially preferred sub-class of amide reactant is N-secondary-alkyl amide, such as those obtained from amidation of alpha-olefines. Such amides may be obtained from the amidation of single cut alpha-olefines varying in chain lengths from $C_{3-48}$ as well as from mixtures of alpha-olefines varying in chain lengths from $C_{3-48}$. Generally chain lengths from about $C_4$ to $C_{26}$ are preferred.

Any caustic material may be employed in the practice of the invention. Exemplary caustic materials include sodium hydroxide, potassium hydroxide, and mixtures thereof; although other alkali metal hydroxides may be used. Sodium hydroxide is generally preferred mainly due to economic considerations.

To result in a completely homogeneous system, a small amount of water is desirable to hold the caustic in solution, but the resulting solution of aqueous caustic must also be soluble in the amide. The amide can hold some water in solution at reaction temperatures; but its ability to hold water is limited. The presence of the alcohol provides the necessary mutual solvent. In preferred embodiments, the maximum amount of alcohol such as methanol is about 4 cc. of methanol per gram of caustic such as sodium hydroxide. Generally, it is preferred to employ a caustic saturated solution of the alcohol. With regard to flaked sodium hydroxide for example this would require about 50–60 cc. of methanol for 24 grams of sodium hydroxide. As a further illustration, satisfactory homogeneity with acetamides is achieved with a 73% solution of sodium hydroxide with methanol. This solution will contain 18.6 grams of the caustic 81.4 grams of methanol and 15 grams of water. For a 300 mole weight amide for example, this would then require 55 grams of 73% sodium hydroxide solution and 175 grams of methanol.

The alcohol present in the reaction medium may be generally any low boiling aliphatic mono-alcohol having from 1 to 8 carbon atoms; and preferably includes the monoatomic aliphatic alcohols of straight or branched chain character. The diatomic aliphatic alcohols such as the glycols and the triatomic aliphatic alcohols such as glycerol may be used.

The homogeneous systems of the invention may be autoclaved to produce the amine. This reaction may be either batch or continuous, and after the reaction is complete the alcohol can be flashed. With no concentration of strong caustic present in the autoclave, all steel equipment is satisfactory. It is not necessary to use more expensive stainless steel, Monel or the like equipment.

Reference is now made to the following exemplary specific examples illustrating the process of the invention.

EXAMPLE I

Aliphatic acetamide, 70% sodium hydroxide and methanol are pumped by high pressure proportioning pumps in molar ratio of 1:1.2:4 into an inclined mixer and then through a heat exchanger and heater where the temperature is raised to about 240° C. Pressure is maintained in the reactor at 670 p.s.i.g. The acetamide is converted to N-secondary-alkyl amine and sodium acetate.

The amine and sodium acetate product in methanol solvent is discharged from the reactor and cooled to 107° C. It is then passed through a pressure reducing valve to expand into a low pressure flash tank. The methanol is flashed to a vapor and passed to a rectifying still. The remaining liquid portion is collected and then heated and sparged with open steam. The steam and alcohol vapor are passed to an alcohol still. The still produces 99% methanol which is condensed. Water containing traces of methanol remaining in the still is pumped back to the flash tank.

The amine, together with the sodium acetate in a water slurry, is discharged from the flash tank and passed to the amine wash tank, where the amine is washed with water to remove the sodium acetate.

EXAMPLE II

In similar fashion as set forth in Example I, N-($C_{11}$–$C_{14}$sec-alkyl) acetamide was hydrolized to N-sec-alkyl primary amine, as follows: 1.1 mole of the acetamide with 1.5 mole of sodium hydroxide were readily solubilized with 6.2 moles of methanol and 1.8 mole of water within two hours time at 230–240° C. in a suitably agitated pressure vessel. The 0.34 mole excess of sodium hydroxide was utilized in the neutralization of the free acid present along with the crude acetamide used as a reactant. The ratio of acetamide to caustic material can be varied with the field material to be hydrolized. The reaction conditions are set forth in Table I. The time and percent conversion for each run of Table I are set forth in Table II.

TABLE I

| Run | Amide, g. | Sodium hydroxide, g. 73% | 100% | Methanol, g. | Water, g. | Temp.,° C. | P.s.i.g. |
|---|---|---|---|---|---|---|---|
| 1 | 314 (1.34 M) | 104 | 76 (1.90 M) | 31 (0.97 M) | 11.9 | 250 | 380 |
| 2 | 290 (1.24 M) | 96 | 70 (1.75 M) | 64 (2.0 M) | 11.1 | 240 | 440–420 |
| 3 | 255 (1.09 M) | 85 | 62 (1.55 M) | 128 (4.0 M) | 9.7 | 240 | 590–600 |
| 4 | 255 (1.09 M) | 85 | 62 (1.55 M) | 160 (5.0 M) | 9.7 | 235–240 | 520–600 |
| 5 | 255 (1.09 M) | 85 | 62 (1.55 M) | 198 (6.18 M) | 9.7 | 230–240 | 650–700 |

TABLE II.—TIME-CONVERSION
[83=100% conversion]

| Hours | ½ | 1 | 2 | 3 | 4 | 5 |
|---|---|---|---|---|---|---|
| 1 | | 51 | 64 | 68 | 73 | |
| 2 | | 56 | 62 | 67 | 72 | 75 |
| 3 | | 74 | 80 | 82 | 83 | |
| 4 | | 78 | 79 | 82 | 83 | |
| 5 | | 80 | 83 | | | |

While this invention has been described with respect to specific details of the process for the hydrolysis of amides to amines, it is not so limited. It is to be understood that variations and modifications thereof, obvious to those skilled in the art, may be made without departing from the spirit or scope of this invention.

What is claimed is:

1. In a process for production of amines by caustic hydrolysis at elevated temperature and super-atmospheric pressure of amides having the formula

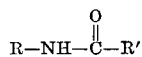

wherein R is an aliphatic hydrocarbon radical having 3 to 48 carbon atoms and R' is selected from the group consisting of hydrogen and short-chain alkyl radicals having 1 to 6 carbon atoms, the improvement comprising, conducting said hydrolysis in a homogeneous system of an aqueous caustic saturated solution of water soluble alcohol selected from the group consisting of aliphatic primary mono-alcohols having 1 to 8 carbon atoms, glycol and glycerol, the mole ratio of said caustic to said amide being about 0.75:1 to about 2.75:1.

2. The process of claim 1 in which said alcohol is a low boiling monoatomic aliphatic alcohol having from 1 to 8 carbon atoms.

3. The process of claim 1 in which said alcohol is methanol.

4. The process of claim 1 in which said caustic is sodium hydroxide and said alcohol is methanol, said methanol being present in proportions of about 4 cc. of methanol per gram of sodium hydroxide.

5. A process for the production of amines by hydrolysis of amides comprising reacting at a temperature of about 230° C. to 250° C. and super-atmospheric pressure an amide having the formula

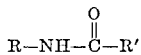

wherein R is an aliphatic hydrocarbon radical having 3 to 48 carbon atoms and R' is selected from the group consisting of hydrogen and short-chain alkyl radicals having 1 to 6 carbon atoms, in the presence of an aqueous caustic saturated solution of water soluble alcohol; said caustic being selected from the group consisting of sodium hydroxide, potassium hydroxide and mixtures thereof; said alcohol being selected from the group consisting of an aliphatic primary alcohol having 1 to 8 carbon atoms, glycol and glycerol; the mole ratio of caustic to amide being about 0.75:1 to about 2.75:1.

6. The process of claim 5 in which said caustic material is flaked sodium hydroxide.

7. The process of claim 5 in which said caustic material is 73% aqueous sodium hydroxide.

8. The process of claim 5 in which said caustic material is selected from the group consisting of flaked sodium hydroxide and 73% aqueous sodium hydroxide, said alcohol is methanol; and said methanol is present in proportion of about 4 cc. of methanol per gram of sodium hydroxide.

9. The process of claim 5 wherein R is a secondary-alkyl group of 3 to 48 carbon atoms.

10. The process of claim 5 wherein R' is selected from the group consisting of hydrogen and methyl.

11. The process of claim 5 wherein said alcohol is methanol.

References Cited

UNITED STATES PATENTS 2,773,097  12/1956  Albert et al.  260—583(L)X
3,457,311  7/1969  Tiefenthal et al.  260—583(L)

CHARLES B. PARKER, Primary Examiner

R. L. RAYMOND, Assistant Examiner

U.S. Cl. X.R.

260—563, 570.5, 570.8, 570.9